(12) United States Patent
Moy

(10) Patent No.: US 6,512,231 B1
(45) Date of Patent: *Jan. 28, 2003

(54) DEVICE FOR MEASURING EXPOSURE OF A SOLID-STATE IMAGE DETECTOR SUBJECTED TO IONISING RADIATION AND IMAGE DETECTOR EQUIPPED WITH SUCH A MEASURING DEVICE

(75) Inventor: Jean-Pierre Moy, Egreve (FR)

(73) Assignee: Thomson Tubes Electroniques, Meudon la Foret (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/424,222
(22) PCT Filed: May 15, 1998
(86) PCT No.: PCT/FR98/00982
§ 371 (c)(1),
(2), (4) Date: Nov. 23, 1999
(87) PCT Pub. No.: WO98/53339
PCT Pub. Date: Nov. 26, 1998

(30) Foreign Application Priority Data

May 23, 1997 (FR) .............................................. 97 06331

(51) Int. Cl.$^7$ ................................................ G01T 1/20
(52) U.S. Cl. ...................................................... 250/368
(58) Field of Search ...................... 250/361 R, 363.01, 250/368, 370.09, 370.11; 378/97, 103, 98.8

(56) References Cited

U.S. PATENT DOCUMENTS

| | | | | |
|---|---|---|---|---|
| 4,029,964 A | * | 6/1977 | Ashe | 250/368 |
| 4,682,018 A | | 7/1987 | Moy | 250/214.1 |
| 4,739,168 A | * | 4/1988 | Aoki | 250/368 |
| 4,743,751 A | | 5/1988 | Arques et al. | 250/215.1 |
| 4,753,512 A | * | 6/1988 | Aurouet et al. | 359/108 |
| 4,910,412 A | * | 3/1990 | Ondris | 250/208.1 |
| 5,281,820 A | * | 1/1994 | Groh et al. | 250/368 |
| 5,629,515 A | * | 5/1997 | Maekawa | 250/207 |
| 5,793,046 A | * | 8/1998 | Jeffers et al. | 250/364 |
| 5,949,848 A | * | 9/1999 | Gilblom | 378/98.8 |
| 5,973,327 A | | 10/1999 | Moy et al. | 250/370.09 |

* cited by examiner

Primary Examiner—Constantine Hannaher
Assistant Examiner—Shun Lee
(74) Attorney, Agent, or Firm—Oblon, Spivak, McClelland, Maier & Neustadt, P.C.

(57) ABSTRACT

A device for measuring the exposure of a solid-state image detector. The image detector includes a first face exposed to ionising radiation representative of the image. The device also lets unabsorbed ionising radiation exit through a second face opposite the first face. The measuring device is configured to be placed close to the second face and to be exposed to the unabsorbed ionising radiation. The device includes at least one optical fiber which emits visible or near visible radiation, obtained by conversion in the optical fiber, towards at least one detection device, the visible or near-visible radiation being representative of the unabsorbed ionising radiation. The detection device produces a signal representative of the exposure of the image detector. Such a device may find particular application to radiology image detectors.

28 Claims, 4 Drawing Sheets

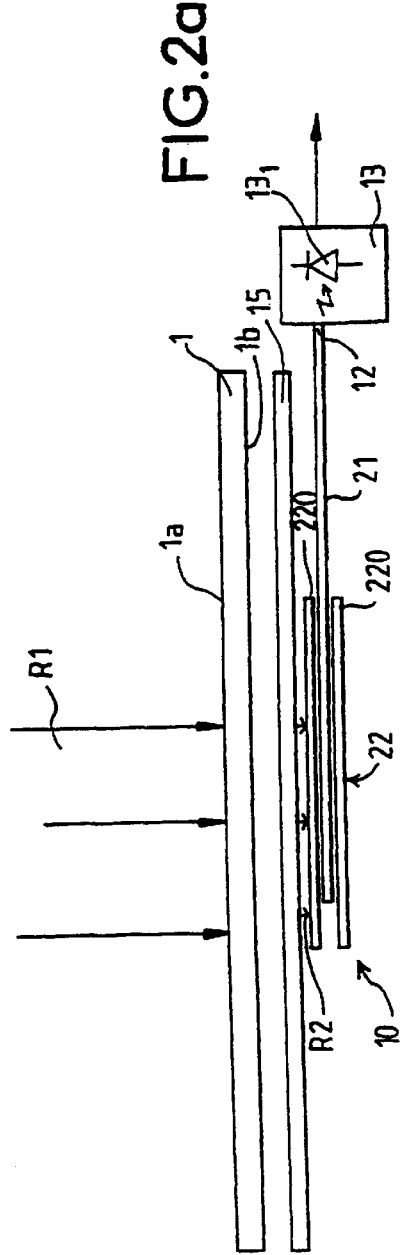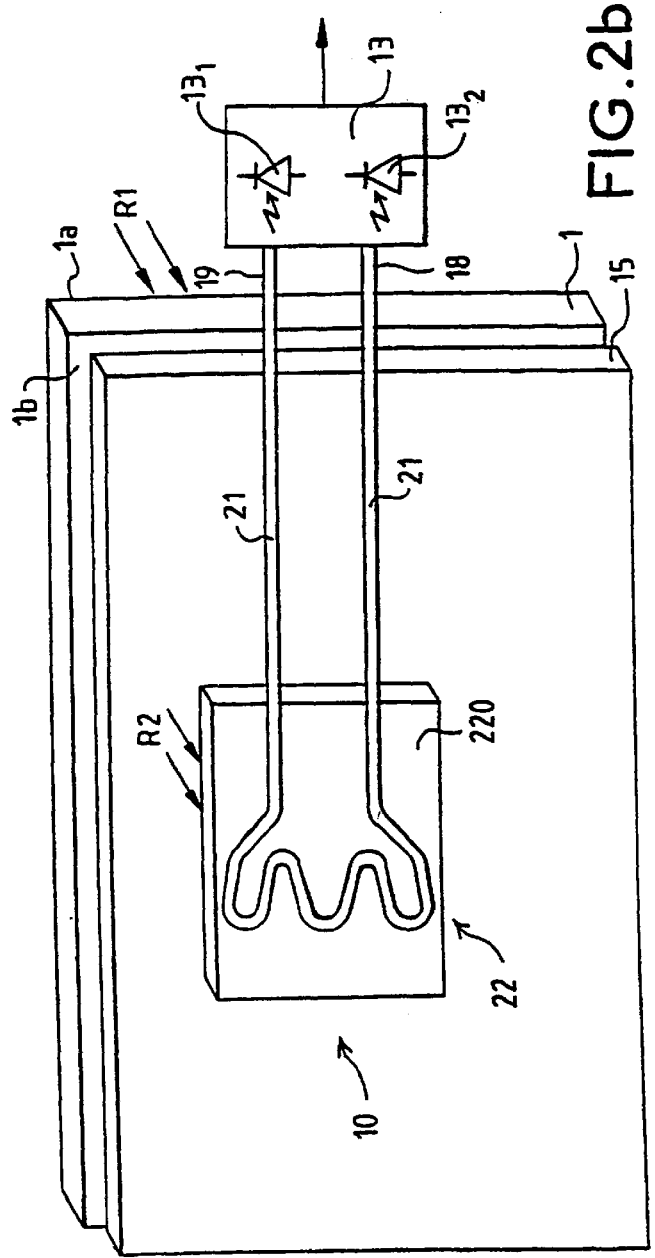

Figure 1A:
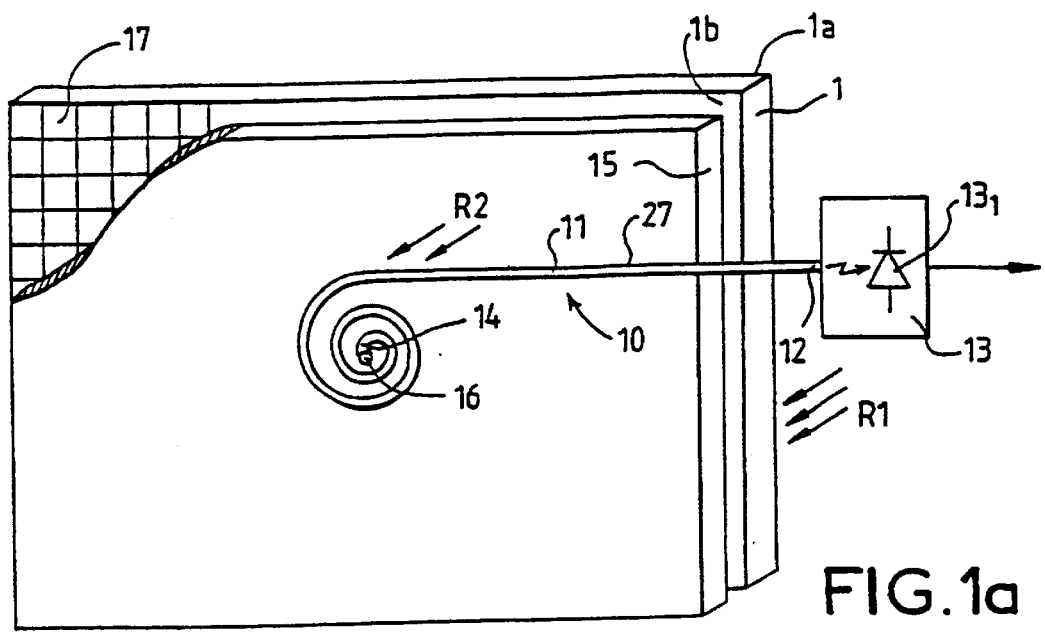

DEVICE FOR MEASURING EXPOSURE OF A SOLID-STATE IMAGE DETECTOR SUBJECTED TO IONISING RADIATION AND IMAGE DETECTOR EQUIPPED WITH SUCH A MEASURING DEVICE

BACKGROUND OF THE INVENTION

1. Field of the Invention

The present invention relates to solid-state image detectors and particularly radiology image detectors receiving X radiation. The invention is also of interest in the field of non-destructive inspection in which the radiation used does not always consist of X-rays but of gamma rays, for example. From now on, the term ionising radiation is used.

2. Discussion of the Background

During the acquisition of an image of a body, whether this is an object or a patient, subjected to incident ionising radiation, X radiation for example, via an image detector, it is normal to measure the radiation dose transmitted by the body to the detector during the exposure, so as to ensure that the detector is actually working in an optimal operating range. This measurement makes it possible, if appropriate, to monitor the duration of the exposure. The measurement should obviously not disturb the image of the body picked up by the detector.

In the conventional case of medical radiological imaging, the image detector is formed by a radiological film. An X-ray generator bombards a part of the patient and the X-rays, emerging from this part to be examined, register on the radiological film to which a fluorescent screen can be applied, allowing the image to be viewed.

It is conventional to place ionising chambers on the path of the X-rays between the patient and the film in order to analyse the radiation received by the film in several regions judged typical of the image.

The intensity of the X radiation received by the ionising chambers is integrated over a few square centimetres in order to give an average measurement of exposure in these regions. This measurement makes it possible to make best use of the dynamic range of the image detector and to cut off the voltage to the X-ray generator when the optimal dose is reached.

These ionisation chambers absorb very little of the X-rays and their shadow is not visible on conventional image detectors.

Image detectors with no radiological film, using radiological image intensifier (RII) tubes, have also been developed. The incident ionising radiation which comes out of the body to be examined penetrates into the RII tube where it is converted by a scintillator into lower-energy radiation, generally light. This light is then converted into electrons by a photocathode. The electrons come to bombard a luminescent screen on which can be viewed a visible image which is the converted image of the ionising radiation which has not been absorbed by the body. In this type of device, monitoring of the exposure takes place directly by measuring the photocathode current.

The new image detectors which are in the process of being developed are solid-state detectors formed by a plurality of sensitive elements generally arranged in a matrix.

These solid-state detectors are produced by depositing a thin film of a semiconductor material, for example amorphous silicon, on an insulating support.

If the sensitive elements are photosensitive, that is to say sensitive to visible or near-visible radiation, a scintillator is interposed between the body and the detector in order to convert the incident ionising radiation which has passed through the body into visible or near-visible radiation. The photosensitive elements react to this visible or near-visible radiation.

The scintillator may be made of caesium iodide, for example. The photosensitive elements then carry out photoelectric conversion of the radiation which they receive into electrical signals which can be made use of by appropriate electronic circuits.

If the sensitive elements are sensitive to charges, a radioconductive layer is interposed between the body and the detector. It converts the incident ionising radiation into charges and the sensitive elements of the detector, receiving these charges, convert them into electronic signals which can be made use of by appropriate electronic circuits.

These solid-state image detectors are very promising, since they supply a digital image. The image can be viewed in real time, easily stored, recovered, processed, transmitted to another site, etc.

These solid-state image detectors open up the possibility of viewing very faintly contrasting details which were not visible on conventional radiological films. The images obtained are much sharper and more detailed.

With these solid-state image detectors, there is no longer any question of using ionising chambers since their shadow is superimposed on the image and is now visible and intrusive.

SUMMARY OF THE INVENTION

The present invention therefore proposes an exposure-measuring device which is capable of being used with a solid-state image detector, formed from sensitive elements exposed to ionising radiation originating from a body to be observed. This measuring device does not disturb the image.

More precisely, the invention is a device for measuring the exposure of a solid-state image detector having a first face exposed to ionising radiation representative of the image and letting unabsorbed ionising radiation exit through another face opposite the first one. The measuring device is intended to be placed close to the other face and to be exposed to this unabsorbed ionising radiation. It includes at least one optical fibre emitting visible or near-visible radiation, obtained by conversion in the optical fibre, towards a detection device, this visible or near-visible radiation being representative of the unabsorbed ionising radiation, the detection device producing a signal representative of the exposure of the image detector.

According to a first configuration of the invention, the optical fibre is scintillating and has its lateral surface exposed to the unabsorbed ionising radiation, it converts the unabsorbed ionising radiation into the visible or near-visible radiation emitted towards the detection device.

According to another configuration of the invention, the measuring device includes a converter of the unabsorbed ionising radiation into a second visible or near-visible radiation. The optical fibre the lateral surface of which is exposed to the second visible or near-visible radiation is fluorescent and converts the second visible or near-visible radiation into the visible or near-visible radiation emitted towards the detection device.

In a simple first embodiment, the converter includes at least one scintillator screen. The scintillator screen may be placed between the image detector and the optical fibre or opposite the image detector with respect to the optical fibre.

In another embodiment giving good conversion efficiency because of better optical coupling, the converter may include agglomerated powder of a scintillating material which sheaths the optical fibre.

In another embodiment having substantially equivalent performance, the converter may include a varnish loaded with scintillating material coating the optical fibre.

It may be that only one of the ends of the optical fibre is coupled to the detection device and, in this case, it is preferable for the other end of the optical fibre to be reflecting.

It is possible for the two ends of the optical fibre to be coupled to the detection device. In this case, the detection device may include a single detector supplying the signal representative of the exposure, this detector being illuminated by the two ends of the optical fibre. It may also include two detectors, each being illuminated by one end of the optical fibre and supplying a signal, the two signals being combined to give the signal representative of the exposure.

When the solid-state image detector is photo-sensitive and includes a zero-reset illumination system, on the same side as its other face, the illumination system may be situated opposite the image detector with respect to the scintillating optical fibre or else between the scintillating optical fibre and the image detector.

When the solid-state image detector is photo-sensitive and includes a zero-reset illumination system, on the same side as its other face, the illumination system is placed between the fluorescent optical fibre and the image detector as the optical fibre is sensitive to the illumination.

It is preferable for the optical fibre to follow an appropriate pattern so as to occupy a significant surface area facing the image detector. It may be wound into a spiral or series of bends.

The present invention also relates to a solid-state image detector including a plurality of sensitive elements, which is intended to detect the image of a body, exposed to incident ionising radiation originating from the body which is equipped with at least one exposure-measuring device as characterized above.

DESCRIPTION OF THE PREFERRED EMBODIMENTS

Figure 1B:
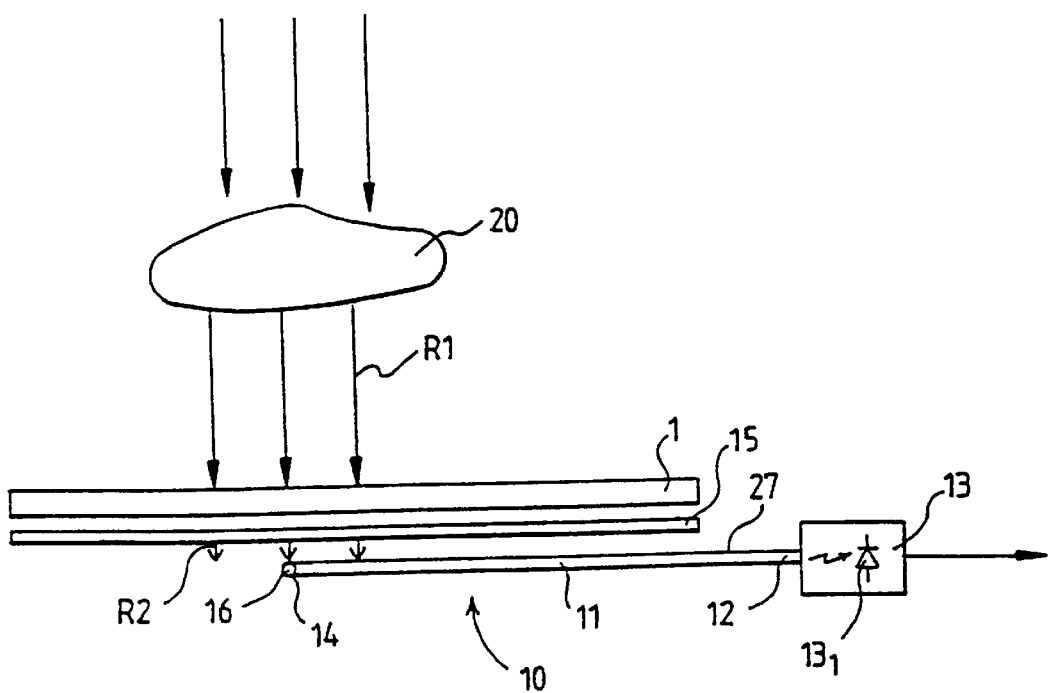
Figure 1C:
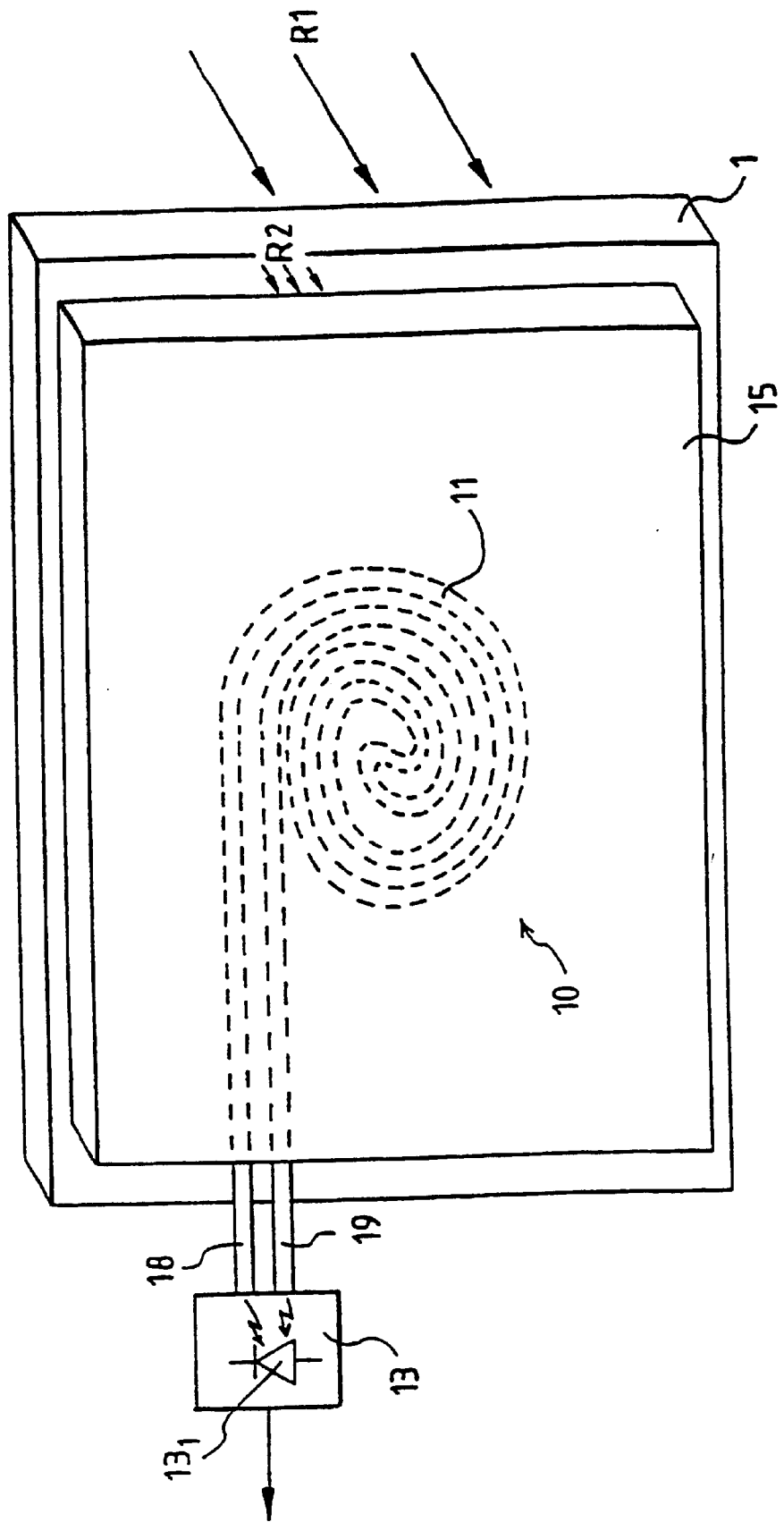

The principle of the invention and of certain of its embodiments will now be described in a non-limiting way in the light of the attached drawings which represent:

FIGS. 1a, 1b, 1c, example embodiments of a measuring device according to the invention with one scintillating optical fibre;

FIGS. 2a, 2b, 2c, 2d example embodiments of a measuring device according to the invention with one fluorescent optical fibre.

FIGS. 1a, 1b show, face on and in cross section, an example of a device 10 for measuring the exposure of a solid-state image detector 1. This image detector 1 is intended to supply an image of a body 20. It receives, through a first face 1a, incident ionising radiation R1 originating from the body 20. This incident ionising radiation R1 is representative of the image.

The solid-state image detector 1 is formed from sensitive elements 17. They may be photosensitive and they are combined with a scintillator, not represented, or be sensitive to charges and they are combined with a radio-conductive layer. The sensitive elements 17 may be arranged in a matrix or in a linear array, for example.

The exposure-measuring device 10 is intended to be placed close to a second face 1b of the image detector 1 opposite the first face 1a. It receives ionising radiation R2 originating from the solid-state image detector 1. This ionising radiation R2 is a fraction of the incident ionising radiation R1 and corresponds overall to that which the solid-state image detector 1 lets out and does not absorb. The exposure-measuring device 10 includes at least one optical filter 11 at least one of the ends 12 of which is coupled to a detection device 13.

The optical fibre 11 emits visible or near-visible radiation towards the detection device 13. This visible or near-visible radiation is representative of the unabsorbed ionising radiation R2. The detection device 13, called light-detection device from now on, produces an electrical signal representative of the exposure of the solid-state image detector 1. It includes at least one light detector 131, for example a photodiode. A phototransistor or another appropriate electronic component would fit the bill.

According to a first configuration of the exposure-measuring device according to the invention, the optical fibre 11 used is a scintillating fibre. This type of optical fibre possesses a core with scintillating properties, that is to say that it converts the unabsorbed ionising radiation R2 into visible or near-visible radiation. The core of the optical fibre is doped with an appropriate material such as terbium or another rare earth which gives it this scintillating property. Exposure of such an optical fibre to ionising radiation produces luminous fluorescence in the core of the optical fibre. A fraction of this fluorescence, depending on the numerical aperture of the fibre, can be picked up and emitted towards the light-detector device 13.

The intensity of the ionising radiation R2 not absorbed by the image detector 1 is proportional to the intensity of the ionising radiation R1 received by the image detector 1. This unabsorbed ionising radiation R2 may represent between 5 and 50% of the ionising radiation R1 received, as the case may be. Only the highest energies are transmitted.

Despite the low intensity of the unabsorbed ionising radiation R2 received by the optical fibre 11, the often mediocre fluorescence efficiency, the small diameter of the optical fibre, a length of optical fibre less than its useful length, the measuring device nevertheless allows a meaningful measurement of the exposure with a light-detection device including, for example, a photodiode of small size. The useful length of an optical fibre is the maximum length beyond which transmission decreases. The useful length of a scintillating optical fibre is about 2 m.

The optical fibre 11 is arranged in such a way as to receive the unabsorbed ionising radiation R2 through its lateral surface 27.

It may be wound into a spiral or into any other pattern, a series of bends for example, so as to pick up the ionising radiation R2 over an appreciable surface area. It is placed within a region of the solid-state image detector 1 in which it is desired to monitor the exposure. The pattern of the fibre will take account of the minimum radius of curvature to be imposed on it in such a way as to avoid disturbing what it is transmitting. Too small a radius of curvature reduces its numerical aperture.

In the case illustrated in FIGS. 1a, 1b, a single end 12 of the optical fibre 11 is coupled to the light-detection device 13. It would be beneficial to render the other end 14 of the optical fibre 11 reflecting so that the maximum visible or near-visible radiation emerges through the first end 12.

Metallization, aluminium-based for example, may cover the face of the optical fibre 11 at this other end 14. It can also be envisaged bonding a mirror 16 to it, as FIGS. 1a, 1b illustrate.

In another embodiment, it is possible for the two ends 18, 19 of the optical fibre 11 to be coupled to the light-detection device 13. This is what FIG. 1c illustrates. In this variant, the light-detection device 13 includes a single light detector 13$_1$ which produces the electrical signal and which is symbolized by a photodiode. The two ends 18, 19 of the optical fibre 11 illuminate this single light detector 13$_1$.

The solid-state image detectors 1, if they possess photosensitive elements, often require an illumination system 15 for resetting them to zero. The illumination system 15 illuminates the second face 1b of the image detector 1.

A scintillating optical fibre 11 is insensitive to the wavelengths of the visible spectrum; it can be placed either between the image detector 1 and the illumination system 15 or opposite the image detector 1 with respect to the illumination system 15 as FIGS. 1a, 1b and 1c illustrate.

Instead of including an optical fibre scintillating to the unabsorbed ionising radiation R2, the exposure-measuring device according to the invention may include a fluorescent optical fibre 21 combined with a converter 22. This is what FIGS. 2a, 2b, 2c and 2d illustrate.

Fluorescent optical fibres have their core produced from an organic polymer loaded with a fluorescent material which converts visible or near-visible radiation into visible or near-visible radiation of longer wavelength. For example, optical fibres are commercially available which, when they are exposed to green, blue or ultraviolet radiation, emit red light. The wavelength of the red lies between 600 and 650 nm whereas those of the green, blue or ultraviolet are less than 600 nm.

In this configuration, the converter 22 receives the unabsorbed ionising radiation R2 and converts it into visible or near-visible radiation to which the optical fibre 21 is exposed and is sensitive.

As in the preceding case, the fraction of the fluorescence contained in the numerical aperture of the optical fibre 21 is emitted towards the light-detection device 13.

The converter 22 may include at least one scintillator screen 220. In the example of FIG. 2b, there is only one single scintillator screen 220 placed between the optical fibre 21 and the solid-state image detector 1. It could have been placed opposite the image detector 1 with respect to the optical fibre.

It could be envisaged, obviously, that there be more than one scintillator screen in order to increase the sensitivity of the measuring device 10. FIG. 2a shows the case in which there are two of them; the two scintillator screens 220 are placed on either side of the optical fibre 21. More than two screens can be used with a view to surrounding the optical fibre as much as possible.

Figure 2C:
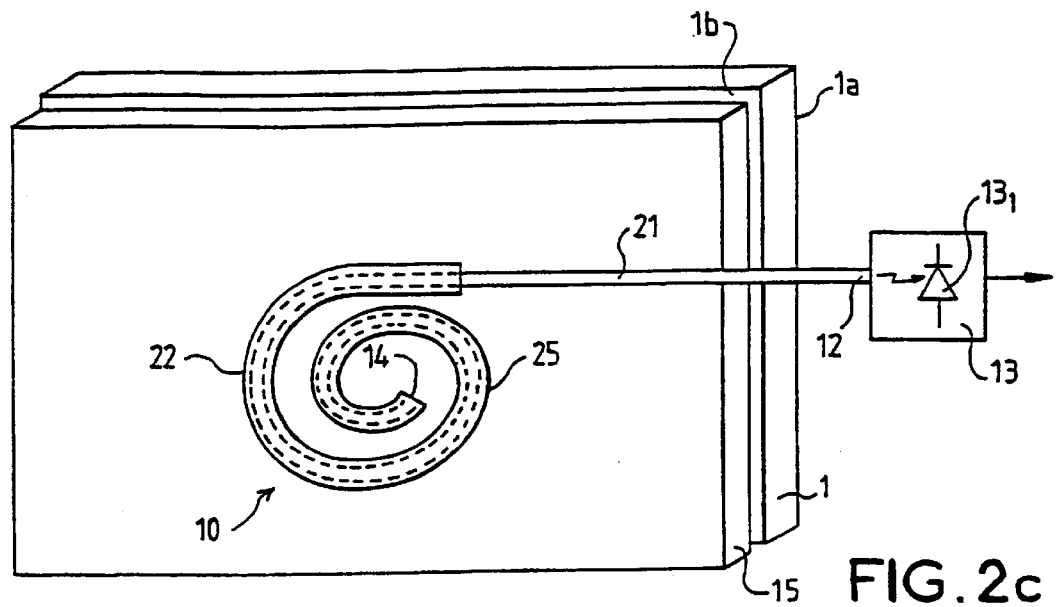

It is also possible, instead of using at least one scintillator screen as converter, to envisage that 35 the optical fibre be coated with a sheath 25 made of agglomerated powder of scintillating material, as FIG. 2c illustrates.

Figure 2D:
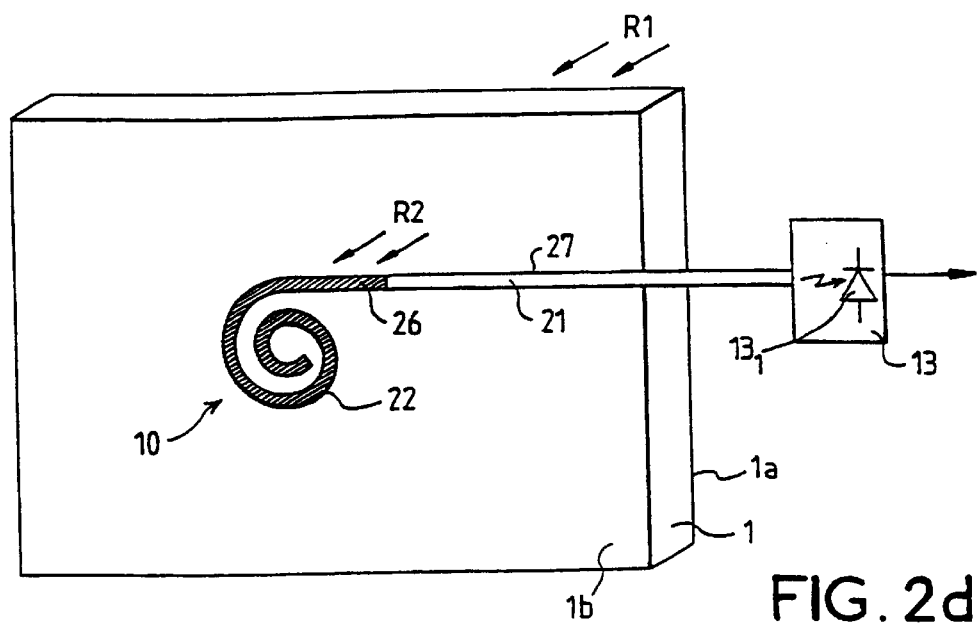

Another solution would be to coat the optical fibre with a varnish 26 loaded with scintillating material as FIG. 2d illustrates.

These latter variants make it possible to enhance the effectiveness of the conversion because of better optical coupling.

These two variants in which the optical fibre is covered may be combined with at least one scintillator screen.

In the configuration with fluorescent optical fibre and converter, the optical fibre 21 and converter will be placed opposite the image detector 1 with respect to the illumination system 15 if the latter exists, since a fluorescent optical fibre is sensitive to the illumination.

Instead of bringing the two ends of the optical fibre 21 to the same light detector 13$_1$, it is possible for the light-detection device 13 to include two light detectors 13$_1$, 13$_2$, each being illuminated by one of the ends 18, 19 of the optical fibre 21. The signals supplied by the two light detectors 13$_1$, 13$_2$ will be combined.

The measuring device with fluorescent optical fibre and converter is practically unaffected by the unabsorbed ionising radiation R2. The same is not necessarily true for the one with scintillating optical fibre which risks exhibiting transmission losses under irradiation.

An idea of the sensitivity of such an exposure-measuring device with fluorescent optical fibre can be had by virtue of the following deliberately pessimistic values:

Transmission from the image detector and from the illumination system: ≈10% of the incident ionising radiation R1.

Absorption and efficiency of conversion of the energy received by the converter: ≈3%.

Efficiency of pick-up and absorption of green light by the optical fibre 21, this light originating from the converter: ≈10%.

Fraction of the light picked up in the numerical aperture of the optical fibre: ≈5.5% on each side.

Transmission between the optical fibre and the light detector: ≈30%.

Quantum yield of the light detector (for example a photodiode): ≈40%.

active surface area of the optical fibre of 1 mm diameter and 500 mm length: ≈500 mm$^2$.

Energy corresponding to a dose of X radiation absorbed of 1μGray (i.e. 30,000 X photons of 50 keV per mm$^2$): 1.5×10$^9$ eV/mm$^2$.

Energy of green photons: 2.25 eVolts

Number of electrons delivered by the light detector for a dose of 1μGray:

$$\frac{1.5 \times 10^9 \times 0.1 \times 0.03 \times 0.1 \times 0.055 \times 0.3 \times 0.4 \times 500}{2.25} \approx 6 \times 10^6$$

Charge on an electron: 1.6×10$^{-19}$ C.

Charge delivered for a minimum dose of 200 nGray:

$$6 \times 10^6 \times 2 \times 10^{-7} \times 1.6 \times 10^{-19} \times 10^6 \approx 0.2 \text{ pC}$$

This charge is entirely measurable under good conditions with a light-detection device 13. It is possible, if appropriate, to have recourse to a charge amplifier in order to amplify the signal produced. An exposure duration of a fraction of a second is sufficient. The fact of placing the exposure-measuring device 10 behind the image detector 1 does not in any way disturb the quality of the image.

In contrast, the signal produced by the light-detection device 13 is preferably accompanied by a calibration coefficient which is a function of the voltage of the incident ionising-radiation R1 generator, since the absorption of the solid-state image detector 1 depends on the spectrum of the incident ionising radiation R1.

Such an exposure-measuring device is not bulky, particularly in thickness, simple to produce at low cost and without spatial resolution. By placing several of them in regions judged typical of the expected image, best use can be made of the dynamic range of the image detector.

The exposure-measuring device according to the invention is not limited to the examples described; the characteristics presented in the various figures may, needless to say, be combined together differently.

What is claimed is:

1. Measuring device of measuring exposure of a solid-state image detector, the image detector having a first face exposed to ionising radiation of the image and letting unabsorbed ionising radiation pass through a second face opposite said first face, wherein the measuring device includes at least one optical scintillating fiber adapted for receiving the unabsorbed ionising radiation through a lateral surface of said optical fiber, converting in terms of wavelength said unabsorbed ionising radiation into a visible or near-visible radiation, and emitting said visible or near-visible radiation, which is representative of the unabsorbed ionising radiation, towards a detection device to produce a signal representative of the exposure of the image detector, and wherein the measuring device is configured to be placed closed to the second face of the image detector and to be exposed to the unabsorbed ionising radiation.

2. Measuring device according to claim 1, wherein a first end of the optical fibre is coupled to the detection device.

3. Measuring device according to claim 2, wherein a second end of the optical fibre is reflecting.

4. Measuring device according to claim 1, wherein first and second ends of the optical fibre are coupled to the detection device.

5. Measuring device according to claim 4, wherein the detection device includes a single detector supplying the signal representative of the exposure, said single detector being illuminated by at least one of the first and second ends of the optical fibre.

6. Measuring device according to claim 4, wherein the detection device includes two detectors, each being illuminated by one end of the optical fibre and supplying a signal, the two signals being combined to give the signal representative of the exposure.

7. Measuring device according to claim 1, wherein said solid-state image detector has a zero-reset illumination system, on a same side as said second face, wherein the illumination system is situated between the scintillating optical fibre and the image detector.

8. Measuring device according to claim 1, wherein said solid-state image detector has a zero-reset illumination system, on a same side as said second face, wherein the illumination system is situated opposite the image detector with respect to the scintillating optical fibre.

9. Measuring device according to claim 1, wherein the optical fibre follows an appropriate pattern so as to occupy a significant surface area facing the image detector.

10. Measuring device according to claim 9, wherein the optical fibre is wound into a spiral.

11. Measuring device according to claim 9, wherein the optical fibre is in a series of bends.

12. Measuring device according to claim 1, wherein said solid-state image detector includes a plurality of sensitive elements, which are configured to detect the image of a body, exposed to incident ionising radiation originating from the body.

13. Measuring device for measuring exposure of a solid-state image detector, the image detector having a first face exposed to ionising radiation of the image and letting unabsorbed ionising radiation pass through a second face opposite said first face, wherein the measuring device includes at least a converter subjected to the unabsorbed ionising radiation and converting in terms of wavelength said unabsorbed ionising radiation in a first visible or near-visible radiation, one optical fluorescent fibre adapted for receiving the first visible or near-visible radiation, through a lateral surface of said optical fibre, for converting in terms of wavelength, said first visible or near-visible radiation, into a second visible or near-visible radiation and for emitting said second visible or near-visible radiation which is representative of the unabsorbed ionising radiation towards a detection device, said detection device producing a signal representative of the exposure of the image detector, and wherein the measuring device is configured to be placed close to the second face of the image detector and to be exposed to the unabsorbed ionising radiation.

14. Measuring device according to claim 13, wherein the converter includes at least one scintillator screen.

15. Measuring device according to claim 14, wherein t he scintillator screen is placed between the image detector and the optical fibre.

16. Measuring device according to claim 14, wherein the scintillator screen is opposite the image detector with respect to the optical fibre.

17. Measuring device according to claim 13, wherein the converter includes agglomerated powder of a scintillating material which sheaths the optical fibre.

18. Measuring device according to claim 13, wherein the converter includes a varnish loaded with scintillating material which coats the optical fibre.

19. Measuring device according to claim 13, wherein a first end of the optical fibre is coupled to the detection device.

20. Measuring device according to claim 19, wherein a second end of the optical fibre is reflecting.

21. Measuring device according to claim 13, wherein first and second ends of the optical fibre are coupled to the detection device.

22. Measuring device according to claim 21, wherein the detection device includes a single detector supplying the signal representative of the exposure, said single detector being illuminated by at least one of the first and second ends of the optical fibre.

23. Measuring device according to claim 21, wherein the detection device includes two detectors, each being illuminated by one end of the optical fibre and supplying a signal, the two signals being combined to give the signal representative of the exposure.

24. Measuring device according to claim 13, wherein said solid-state image detector has a zero-reset illumination system, on a same side as said second face, wherein the illumination system is placed between the fluorescent optical fibre and the image detector.

25. Measuring device according to claim 13, wherein the optical fibre follows an appropriate pattern so as to occupy a significant surface area facing the image detector.

26. Measuring device according to claim 25, wherein the optical fibre is wound into a spiral.

27. Measuring device according to claim 25, wherein the optical fibre is in a series of bends.

28. Measuring device according to claim 13, wherein said solid-state image detector includes a plurality of sensitive elements, which are configured to detect the image of a body, exposed to incident ionising radiation originating from the body.

* * * * *

UNITED STATES PATENT AND TRADEMARK OFFICE
CERTIFICATE OF CORRECTION

PATENT NO.    : 6,512,231 B1                                          Page 1 of 1
DATED         : January 28, 2003
INVENTOR(S)   : Moy It is certified that error appears in the above-identified patent and that said Letters Patent is hereby corrected as shown below:

<u>Title page, Item [54] and Column 1, lines 1-5,</u>
Title, should read:

-- [54]  DEVICE FOR MEASURING EXPOSURE OF A SOLID-STATE IMAGE SENSOR SUBJECTED TO AN IONISING RADIATION AND DETECTOR EQUIPPED WITH SAME --

Signed and Sealed this

Fifteenth Day of July, 2003

JAMES E. ROGAN
*Director of the United States Patent and Trademark Office*